United States Patent
Nishimoto et al.

[11] Patent Number: 6,023,757
[45] Date of Patent: Feb. 8, 2000

[54] DATA PROCESSOR

[75] Inventors: Junichi Nishimoto, Hachioji; Hideo Maejima, Hitachi, both of Japan

[73] Assignee: Hitachi, Ltd., Tokyo, Japan

[21] Appl. No.: 08/791,811

[22] Filed: Jan. 30, 1997

[30] Foreign Application Priority Data

Jan. 31, 1996 [JP] Japan .................................. 8-015016

[51] Int. Cl.⁷ .................................................. G06F 15/16
[52] U.S. Cl. ............................................. 712/209; 712/32
[58] Field of Search ...................... 395/800.15; 712/209, 712/212, 32, 34; 709/1

[56] References Cited

U.S. PATENT DOCUMENTS

| | | | |
|---|---|---|---|
| 5,699,536 | 12/1997 | Hopkins | 395/392 |
| 5,774,686 | 6/1998 | Hammond | 395/385 |
| 5,778,423 | 7/1998 | Sites | 711/118 |
| 5,784,636 | 7/1998 | Rupp | 395/800.37 |
| 5,794,062 | 8/1998 | Baxter | 395/800.3 |

*Primary Examiner*—Eric Coleman
*Attorney, Agent, or Firm*—Antonelli, Terry, Stout & Kraus, LLP

[57] ABSTRACT

A data processor which includes a first processor for executing a first instruction set and a second processor for executing a second instruction set different from the first instruction set. When the first processor executes a predetermined instruction of the first instruction set the second processor executes an instruction of the second instructions set. The first processor may be a reduced instruction set computer (RISC) type processor, the second processor may be a very long instruction word (VLIW) type processor, the first instruction set may be a RISC instruction set and the second instruction set may be a VLIW instruction set. The predetermined instruction of the RISC instruction set executed by the first processor may be a branch instruction causing a branch to a specific address space at which VLIW instructions are stored. Thereafter, the VLIW instructions at the specific address space are executed by the VLIW type processor.

62 Claims, 10 Drawing Sheets

MEMORY MAP
ADDRESS SPACE

```
┌─────────────────────┐
│                     │
│   PROGRAM AREA      │
│   OF FIRST          │
│   PROCESSOR         │
│                     │
├─────────────────────┤
│                     │
│   PROGRAM AREA      │
│   OF SECOND         │
│   PROCESSOR         │
│                     │
├─────────────────────┤
│                     │
│                     │
│   DATA AREA         │
│                     │
│                     │
├─────────────────────┤
│                     │
│                     │
│   OTHER AREAS       │
│                     │
│                     │
└─────────────────────┘
```

F/G. 9

DATA PROCESSOR

BACKGROUND OF THE INVENTION

The present invention relates to a data processor such as a microprocessor or a microcomputer. More particularly the present invention relates to a method and apparatus for use in a data processor to cause the data processor to attain high-speed performance while maintaining software compatibility.

There are varieties of architectures for microprocessors. For example, there are microprocessors of CISC (Complexed Instruction Set Computer), RISC (Reduced Instruction Set Computer) and VLIW (Very Long Instruction Word) (or LIW (Long Instruction Word)) types to name a few.

With, for example, 8 or 16 bits as a minimum instruction length unit, the CISC type microprocessor forms an instruction system (an instruction set) with a variable-length instruction format of integral multiples of the minimum instruction length unit. In this case, a maximum instruction length ranges from 48 bits to 64, 80 bits and so forth. Due to microprogrammed control with a large number of instructions constituting an instruction set and due to the fact that a plurality of processes are performed by one instruction and the instruction length is variable, the amount of required hardware is large, so that the architecture is said to have a drawback in seeking high-speed performance. Motorola's 680X0 and Intel's 80X86 are typical examples of the CISC type microprocessor.

A key to attaining such high-speed performance, the RISC type microprocessor has been introduced. The RISC type microprocessor forms an instruction system with an instruction format of fixed 16-bit, 32-bit or 64-bit length wherein a simple process is performed by one instruction, whereby a relatively small number of instructions constitute the instruction system. Since the instruction is simple, the amount of required hardware of the control unit of the microprocessor is smaller than that of the CISC type microprocessor. Therefore this architecture is fit for pipeline processing and relatively easy to attain high-speed performance. An instruction format with a mixture of 16- and 32-bit length instructions constitutes the instruction system in some cases. Sun Microsystems' SPARC and MIPS Technologies' MIPS (e.g., R3000) are typical examples of the RISC processor.

In order to meet a growing demand for increasing operating speed, there has recently been employed a method of increasing the number of arithmetic units to be simultaneously operated in addition to the method of improving the operating frequency. The system for simultaneously operating a plurality of arithmetic units is called a superscalar system. However, the superscalar system needs the function of examining whether a plurality of instructions can simultaneously be executed, that is, the function of the instruction dependency and therefore the circuit scale tends to increase.

The VLIW type processor is a processor forming an instruction system with an instruction format of long instruction length though fixed length. In such a VLIW processor, a plurality of computing units are simultaneously operated by means of an instruction of 128 bits or longer. The number of computing units (the number of processing instructions executable in parallel) to be simultaneously operated is greater than that of the superscalar system. In the VLIW type processor, instruction dependency is checked beforehand at the time of compiling the source program and simultaneously executable instructions are combined into one instruction. When the number of simultaneously executable instructions does not reach the maximum number of simultaneously executable instructions, a NOP (No-operation) instruction is inserted by a compiler. The circuit scale of the VLIW type processor is smaller than that of the superscalar system of the RISC type microprocessor because the instruction dependency need not be checked at the time of execution of the VLIW type processor. Trace ce/300 of multiflow Computer Co. carried in Nikkei Electronics of Nov. 27, 1989 (No. 487), pp 196–197 is a typical example of the VLIW type processor.

The adoption of the RISC type architecture, for example, has improved operating frequency and increased the number of simultaneously executable instructions, thus resulting in improved performance of microprocessors. It has therefore been planned to use software for compression/expansion (MPEG (Moving Picture Experts Group) decoder/encoder) of moving pictures and three-dimensional graphic processing that have heretofore been done by using dedicated hardware or controllers.

The VLIW type microprocessor is thought to be fit for a processing for multimedia use dealing with a large quantity of data by repeating the same process including MPEG decoder/encoder and three-dimensional graphic processing.

A typical conventional microprocessor or a CPU (Central Processing Unit) is of a CISC or RISC type and possesses an accumulation of software assets. Microprocessors of the CISC, RISC and VLIW types each have different instruction sets, instruction formats, addressing modes, programming modes and the like; that is, no software compatibility exits.

There are limitations to improvement in the performance of a microprocessor having one of the above-described with the same architectures (including the instruction system). Thus, in order to improve performance the architecture of the microprocessor must be altered. However, altering the architecture of the microprocessor causes the problem to arise of compatibility with the accumulated software assets.

SUMMARY OF THE INVENTION

An object of the present invention is to provide a high-performance processor capable of executing software using a new architecture (instruction system) while maintaining compatibility with conventional software.

Another object of the present invention is to provide a high-performance processor capable of jointly processing or using resources in the processor such as arithmetic units so as to prevent an increase in the amount of required hardware.

Still another object of the present invention is to realize high-speed operation and low power consumption through a processor-to-processor operation control system.

The present invention provides a data processor which includes a first processor for executing a first instruction set and a second processor for executing a second instruction set different from the first instruction set and when the first processor executes a predetermined instruction of the first instruction set, the second processor executes an instruction of the second instruction set.

The data processor executes a program stored in a memory unit. The program includes a first program having instructions of a first instruction set and a second program having instructions of a second instruction set different from the first instruction set. The first and second programs are arranged in an address space of the data processor.

An instruction of the first instruction set has a variable length, whereas an instruction of the second instruction set has a fixed length. The maximum word length of an instruction of the first instruction set may be greater than the word length of an instruction of the second instruction set. The maximum word length of an instruction of the first instruction set may be shorter than the word length of an instruction of the second instruction set.

An instruction of the first instruction set and an instruction of the second instruction set may have a fixed length. The word length of an instruction of the first instruction set may be shorter than the word length of an instruction of the second instruction set.

The data processor includes a first data processing unit which has a plurality of computing units and is used for reading an instruction from a first memory which stores a first group of instructions and executing the instruction, a second data processing unit which has a plurality of computing units capable of parallel operation and is used for executing instructions simultaneously executable as one instruction, and a second memory for storing a group of instructions which the second data processing unit executes. When the instruction read by the first data processing unit is a predetermined instruction, an instruction to be executed by the second data processing unit is read from the second memory.

The present invention further provides a microprocessor which includes a RISC core for executing RISC instruction, a VLIW table for storing VLIW instructions, a VLIW core for executing a VLIW instruction, and a VLIW start decision unit for controlling operation switching between the RISC core and the VLIW core. When the RISC core executes a subroutine call or a branch instruction out of RISC instructions, a VLIW instruction is read from the VLIW table by use of a branch destination address and operation is transferred by the VLIW start decision unit from the RISC core to the VLIW core, whereby the VLIW instruction is caused to operate until a VLIW core completion code is read from the VLIW table.

The microprocessor further includes an address translation table translation-lookaside-buffer (TLB) for subjecting the branch destination address to address translation so that a signal for expanding the VLIW instruction read from the VLIW table may be read from the TLB simultaneously when the address translation is conducted.

The microprocessor even further includes a circuit for examining whether the operation of the VLIW instruction executed subsequent to a branch to the VLIW instruction is relevant to the operation of the RISC instruction which is restored after the execution of the VLIW instruction. The microprocessor is capable of executing the RISC instruction at the restoring destination in parallel without waiting for the completion of the VLIW instruction when no relevance exists.

The microprocessor includes a register for prohibiting and controlling the execution of the VLIW instruction in the processor and a function of lowering power consumption by causing a branch to a string of RISC instructions performing an operation equivalent to the VLIW instruction at the time the execution of the VLIW instruction is prohibited so as to suspend the operation of the VLIW core.

A non-volatile memory has a built-in VLIW table. The non-volatile memory is preferably one of a masked ROM, a flash memory and a ferroelectric memory. A volatile memory has a built-in VLIW table. The volatile memory of the VLIW table is preferably either SRAM or DRAM. A memory rewritable with the processor of the RISC core preferably has a built-in VLIW table.

BRIEF DESCRIPTION OF THE DRAWINGS

The present invention will be more apparent from the following detailed description, when taken in conjunction with the accompanying drawings, in which:

FIG. 9 is a memory map of the microcomputer of FIG. 8.

DETAILED DESCRIPTION OF THE PREFERRED EMBODIMENTS

Embodiment 1

Figure 1:
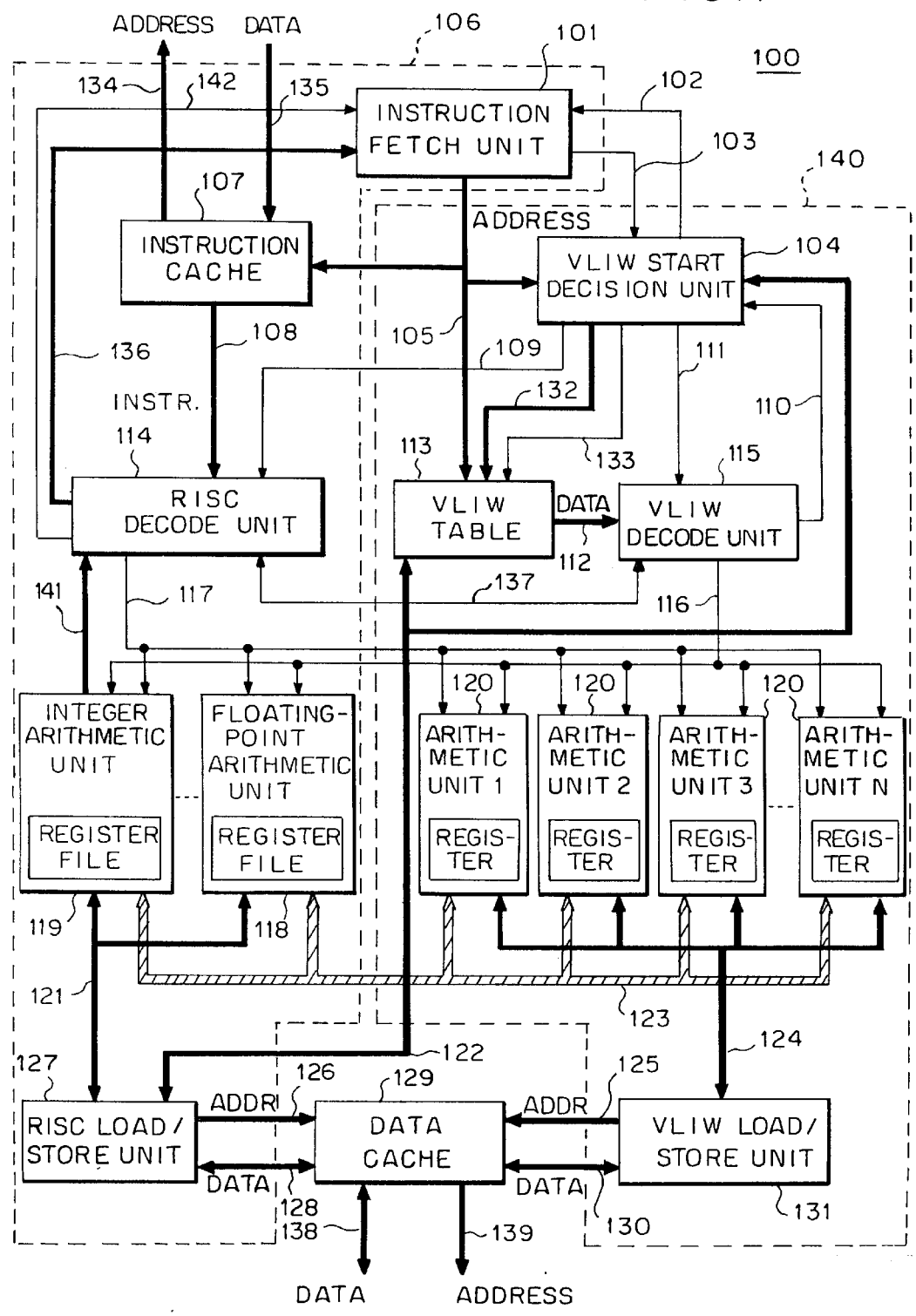
FIG. 1 is a block diagram of a microprocessor embodying the present invention.

FIG. 1 is a block diagram of a microprocessor 100 embodying the present invention. The microprocessor 100 includes a RISC core section 106 where processing of RISC instructions is performed, a VLIW core section 140 where processing of VLIW instructions is performed and a data cache 129. The technology of manufacturing semiconductor integrated circuits is used to form the microprocessor 100 on one semiconductor substrate of single crystal silicon and the resin molding technique is used for the packaging of the semiconductor substrate by so-called plastic packaging. A RISC instruction is, for example, an instruction to be executed by the RISC type microprocessor described above, whereas a VLIW instruction is, for example, an instruction to be executed by the VLIW type microprocessor described above.

The RISC core section 106 includes an instruction fetch unit 101, an instruction cache 107, a RISC instruction decode unit 114, a floating-point arithmetic unit 118, an integer arithmetic unit 119 and a RISC load/store unit 127. The floating-point unit 118 is an arithmetic unit specifically dealing with floating-point data and also performing operations on the floating-point data. The integer arithmetic unit 119 is an arithmetic unit specifically dealing with integer data and also performing operations on the integer data.

The VLIW core section 140 includes a VLIW start decision unit 104, a VLIW table 113, a VLIW instruction decode unit 115, N pieces of arithmetic units 120 and a VLIW load/store unit 131.

The instruction fetch unit 101 transfers the address of an instruction to be executed to an instruction address bus 105. When a RISC instruction is executed, an instruction corresponding to an address of the instruction address bus 105 is read from the instruction cache 107 to an instruction bus 108 and the RISC instruction is decoded by the RISC instruction decode unit 114. When an applicable instruction is absent (cache miss) in the instruction cache 107, an address bus 134 and a data bus 135 are used to read an instruction from a memory outside the microprocessor via a bus controller (not shown). The decoded result in the RISC decode unit 114 is used to control the floating-point arithmetic unit 118, the integer arithmetic unit 119 and the like through a RISC arithmetic unit control signal 117. Access to the arithmetic units 120 may occur because the arithmetic units 120 of the VLIW core and the integer arithmetic unit 119 as well as the floating-point arithmetic unit 118 of the RISC core are jointly owned as shown in FIG. 1.

In a case where the instruction is a memory access instruction, moreover, access to not only the RISC load/store unit 127 but also the data cache 129 occurs via an address bus 126, so that data is stored in the registers of the integer arithmetic unit 119 and the floating-point arithmetic unit 118 via a data bus 128 and a data bus 121 for RISC. When applicable data is absent (cache miss) in the data cache 129, an address bus 139 and a data bus 138 are used to provide access to the memory outside the microprocessor via the bus controller.

When there occurs a branch RISC intion (part of the RISC instruction) for executing the VLIW instruction while the RISC instruction is executed, the instruction fetch unit 101 is notified by the RISC instruction decode unit 114 through a VLIW branch instruction decode signal 142 that the branch instruction has been given. A signal branch destination address is transmitted via a branch destination address bus 136. In a case where the branch destination address is stored in the register of a register file, it is transferred from the integer arithmetic unit 119 via a branch destination address bus 141 to the RISC instruction decode unit 114. The VLIW table 113 is allocated to a specific address space of the memory space of the RISC core and the VLIW instruction stored in the VLIW table 113 is made accessible by gaining access to the address space, whereby the VLIW instruction from the VLIW table 113 can be read and rewritten.

On receiving the notification of the branch instruction through the VLIW branch instruction decode signal 142, the instruction fetch unit 101 notifies the fact that a branch to a VLIW instruction has occurred to the VLIW start decision unit 104 through the VLIW instruction branch signal 103. The VLIW start decision unit 104 decides the condition of activating the VLIW instruction and makes the RISC instruction decode unit 114 suspend the execution of the instruction that is read with the address on the instruction address bus 105 through a RISC core control signal 109. The clock of the whole or part of the RISC core 106 may be stopped so as to reduce power consumption when designated by the register in the RISC instruction decode unit 114 or the VLIW instruction decode unit 115. Even when the VLIW instruction is not executed, the clock of the whole or part of the VLIW core may also be stopped likewise.

The address of the instruction address bus 105 is used to read the VLIW instruction from the VLIW table 113 to a VLIW instruction bus 112. The VLIW instruction decode unit 115 decodes the VLIW instruction on the VLIW instruction bus 112 on the basis of the activating condition transferred from the VLIW start decision unit 104 through a VLIW instruction decode start signal 111, and individually controls the arithmetic units 120 or the integer arithmetic unit 119 and floating-point arithmetic unit 118 of the RISC core section 106 in parallel through a VLIW arithmetic unit control signal 116. The arithmetic units 120 include an integer arithmetic unit, a floating-point arithmetic unit, a DSP (Digital Signal Processor: e.g., product sum computation) dealing with fixed-point data and the like. FIG. 1 shows an example of a local register file type processor when arithmetic units each have their own register files. A transfer of data between arithmetic units is conducted through a computing unit-to-computing unit data bus 123.

When the memory access instruction is contained in the VLIW instruction, the VLIW load/store unit 131 has access to the data cache 129 via an address bus 125, a data bus 130 and a data bus 124 for VLIW.

When VLIW instructions are continuously given, the address information held in the VLIW start decision unit 104 via the instruction address bus 105 is used for the VLIW instruction to be read from the VLIW table 113 through an address on an instruction address bus 132 and a VLIW table control signal 133. When the VLIW instruction thus read contains a completion code indicative of the final instruction, the VLIW start decision unit 104 is notified by the VLIW instruction decode unit 115 through a VLIW instruction running state signal 110 that a string of VLIW instructions has been completed. The VLIW instruction running state signal 110 also outputs information which affects the execution of the VLIW instruction such as interruption, exception and the like in addition to the completion of the VLIW instruction. On admitting the completion of the VLIW instruction string, the VLIW start decision unit 104 communicates the completion of the VLIW instruction through a VLIW instruction completion signal 102 and the RISC core control signal 109 to the instruction fetch unit 101 and the RISC instruction decode unit 114, and returns to the RISC instruction.

More specifically, the RISC core section 106 is used for the execution of a RISC instruction, whereas the VLIW core section 140 is used for the execution of a VLIW instruction. The execution of instructions in the VLIW core section 140 is carried out by making the VLIW start decision unit 104 successively read VLIW instructions from the VLIW table 113 that the VLIW start decision unit 104 holds within the microprocessor, with the branch instruction to the VLIW instruction newly added to the RISC instruction or specific address branching as a trigger. After the VLIW instruction is executed, the processing is restored to the RISC instruction string. In other words, VLIW instructions to be executed are dealt with like a subroutine, whereby the processing which needs high-speed action can be executed under the VLIW instruction by storing the instructions in the VLIW table 113. Use of instructions thus reduced to a subroutine makes it possible to maintain compatibility by arranging a string of RISC instructions acting like VLIW instructions at a branch destination even in the case of a microprocessor having no VLIW circuitry.

In a case where action of low power consumption is needed and no high-speed action using the VLIW instruction is needed, the operation of only the RISC core section 106 may be relied upon while the operation of the VLIW core section 140 is suspended, depending on the state of the built-in control register. Conversely in a case where the operation of the RISC core section 106 is not needed, the operation of only the VLIW core section 140 may be relied upon while the operation of the RISC core section 106 is suspended.

It is possible to use resources in common because the computing units (including register files) of the VLIW core section 140 are usable while the RISC instruction is executed and because the computing units (including register files) of the RISC core section 140 are usable while the VLIW instruction is executed. Therefore, the chip area of a semiconductor integrated circuit becomes reducible.

The VLIW start decision unit 104 decides, on the basis of the decoded result obtained through a control signal 137, whether the VLIW instruction which is being executed is dependent on the RISC instruction as a destination to which the VLIW instruction returns after the VLIW instruction has completely been executed. In the absence of such dependency, selection of control of parallel execution of the RISC and VLIW instructions is possible through the VLIW instruction completion signal 102 and the RISC core control signal 109.

For the VLIW table 113, use can be made of a non-volatile memory such as a masked ROM to be programmed during the process of manufacturing semiconductors, an EPROM (electrically writable ultraviolet ray erasable non-volatile memory), an EEPROM (electrically erasable/writable non-volatile memory), a flash memory (flash EEPROM) and a ferroelectric memory; and a volatile memory such as a DRAM (Dynamic RAM) and an SPRAM (Static RAM). When a rewritable memory, for example, an EEPROM, a flash memory, a ferroelectric memory, a DRAM and a SRAM is employed, the VLIW table 113 corresponding to the system may be set via a VLIW table data bus 122, whereby the VLIW table 113 is made dynamically most suitable for the system during the operation of the microprocessor 100. The VLIW table data bus 122 is also used to provide access to the register in the VLIW start decision unit 104. If SRAM is employed for the VLIW table 113, writing and reading can be carried out at higher speed as compared with the use of any other memory. Since the memory element of DRAM is composed of one transistor while the memory element of SRAM is composed of four to six transistors, a VLIW table using DRAM can be made smaller than when using SRAM. Although the ferroelectric memory is a non-volatile memory, write time can be made substantially equal to read time. Therefore, the use of such a ferroelectric memory makes the rewriting of the VLIW table 113 as quick as that of DRAM.

Modified Embodiment 1

Figure 2:
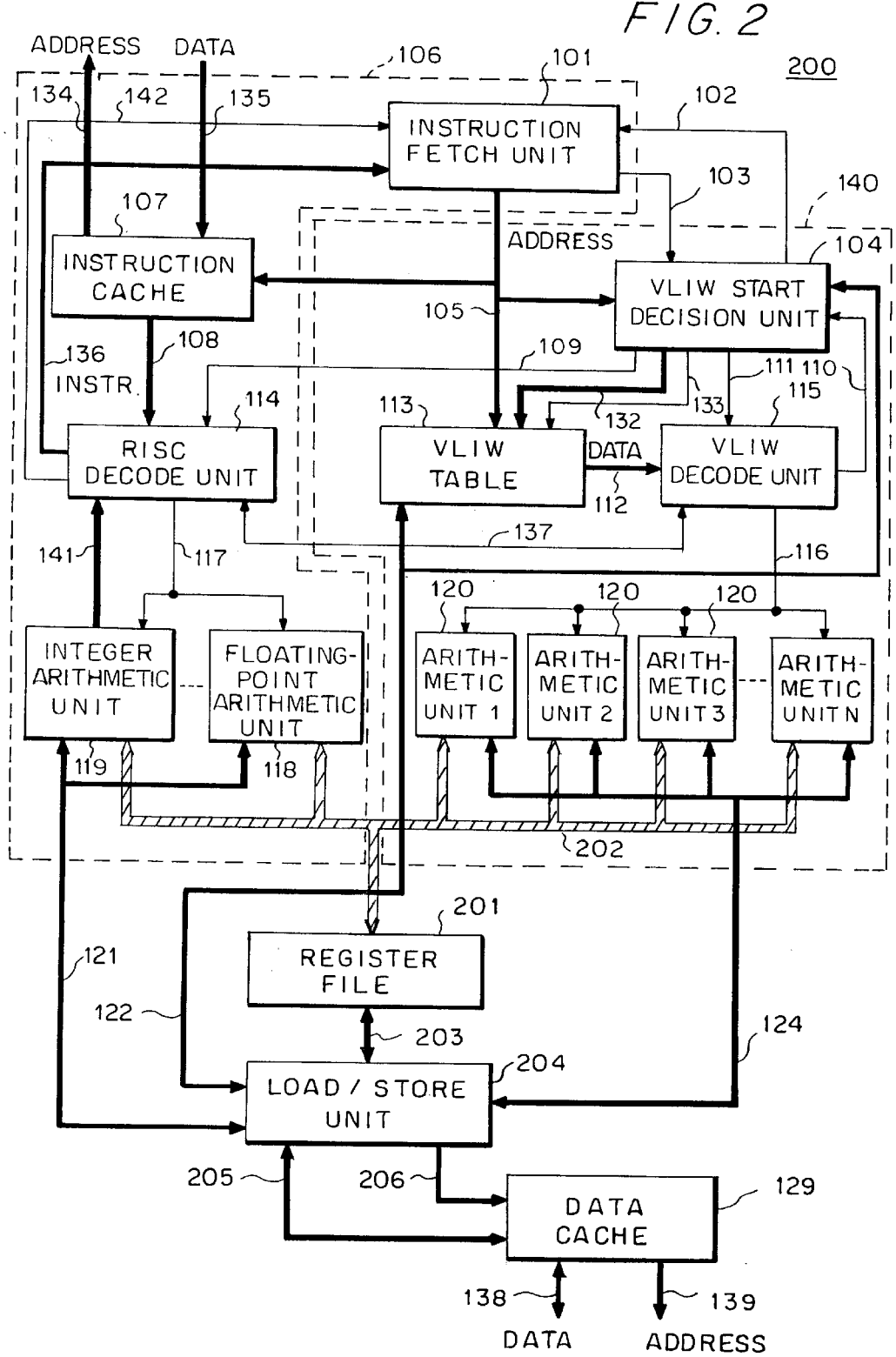
FIG. 2 is a block diagram of a modified microprocessor in reference to FIG. 1.

FIG. 2 shows a modified example of the microprocessor of FIG. 1. What is shown in FIG. 2 is a global register type microprocessor having the registers of the RISC and VLIW cores 106, 140 in common, wherein like reference characters designate like component parts of the microprocessor of FIG. 1. The technology of manufacturing semiconductor integrated circuits is used to form a microprocessor 200 on one semiconductor substrate of single crystal silicon and the resin molding technique is used for the packaging of the semiconductor substrate by so-called plastic packaging.

In the microprocessor 200, a register file 201 is used for read/write operations from and to the floating-point arithmetic unit 118, the integer arithmetic unit 119 and the arithmetic units 120 via a bus 202 between the arithmetic units and the register file. In the case of a memory access instruction, access to a load/store unit 204 occurs via the data bus 121 for RISC and the data bus 124 for VLIW. Data is transferred between the register file 201 and the load/store unit 204 via a bus 203. Data is also transferred between the load/store unit 204 and the data cache 129 via an address bus 206 and a data bus 205. Unlike FIG. 1, FIG. 2 refers to a case where arithmetic units are allowed to control the RISC arithmetic unit control signal 117 and the VLIW arithmetic unit control signal 116 are limited to the arithmetic units in the respective cores.

Since the RISC and VLIW cores 106, 140 have the register file 201, the load/store unit 204 and the data cache 129 in common, the chip area of the semiconductor integrated circuit is reducible.

Detailed Description of VLIW Core

Figure 3:
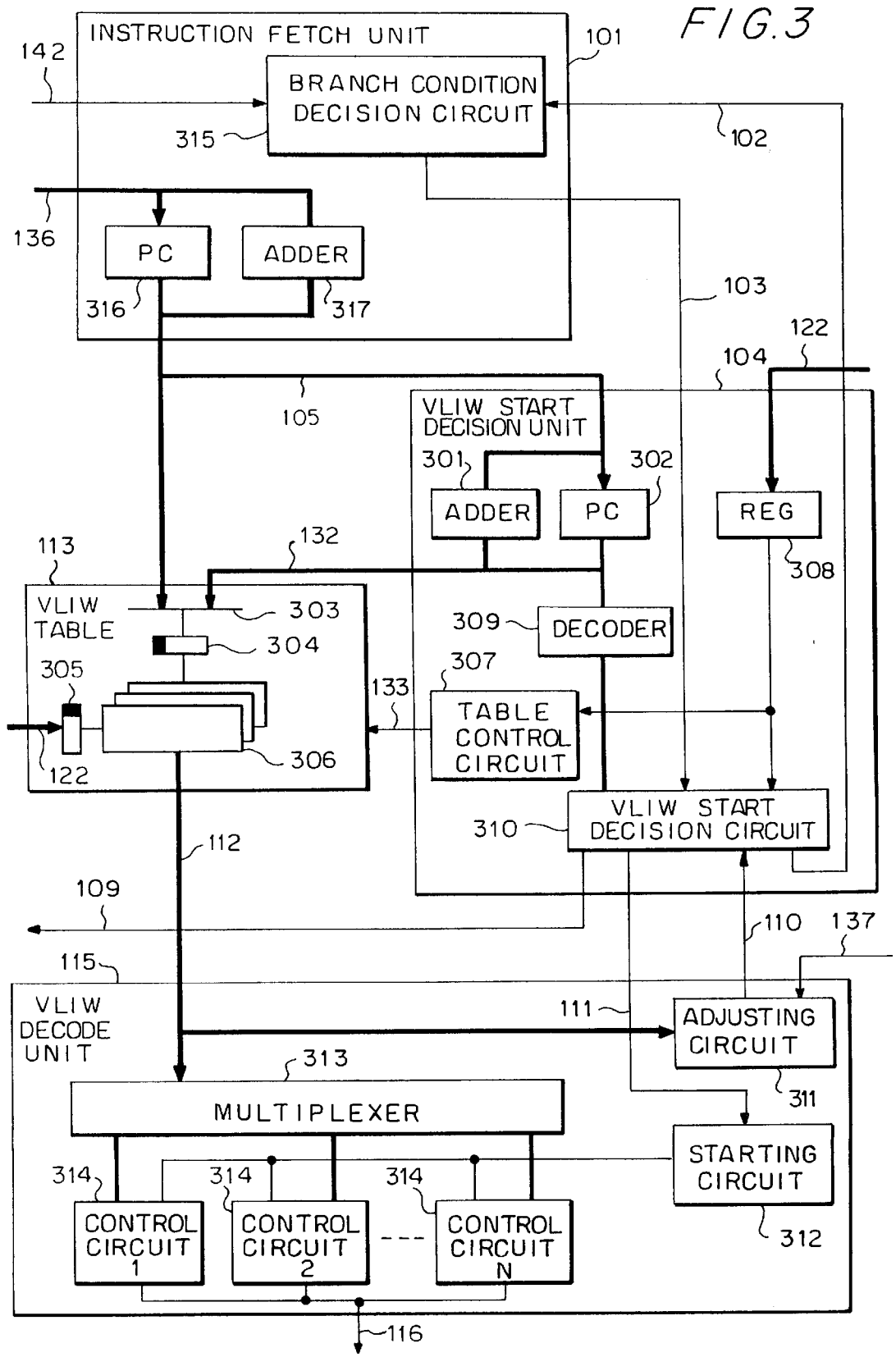
FIG. 3 is a detailed illustration of the VLIW start theory of the microprocessor in FIGS. 1 and 2.

FIG. 3 is a block diagram illustrating in detail the instruction fetch unit 101, the VLIW table 113, the VLIW start decision circuit 104 and the VLIW instruction decode unit 115 shown in FIGS. 1 and 2.

The instruction fetch unit 101 comprises a branch condition decision circuit 315, a program counter 316 for the RISC core and an adder 317.

In the instruction fetch unit 101, the branch condition decision circuit 315 receives the VLIW branch-to-VLIW-instruction decode signal 142 and communicates the occurrence of a branch to the VLIW instruction to the VLIW start decision circuit 104 through the VLIW instruction branch signal 103. The branch condition decision circuit 315 also decides whether the VLIW instruction has completed through the VLIW instruction completion signal 102 from the VLIW start decision circuit 104. It is thus possible to prevent the VLIW core 140 from being doubly activated during the parallel operation of the VLIW core 140. When such a branch to the VLIW instruction occurs, an address set in the program counter (PC) 316 for the RISC core is transferred form the branch destination address bus 136 to the instruction address bus 105. The program counter 316 for the RISC core is updated by the adder 317.

The VLIW table 113 includes a selector 303, an address latch 304, a data latch 305 and a VLIW table storage memory 306. In the VLIW table 113, the selector 303 is used to select an address set by the instruction fetch unit 101 via the instruction address bus 105 and an address set by a program counter 302 for VLIW held in the VLIW start decision circuit 104 via the instruction address bus 132. The address thus selected is set at the address latch 304 and used to transfer the VLIW instruction from the VLIW table storage memory 306 to the VLIW instruction bus 112. The VLIW table is changed by means of the data transferred to the VLIW table data bus 122 via the data latch 305 with respect to the VLIW table storage memory 306 indicative of the address designated by the address latch 304.

The VLIW start decision circuit 104 includes the VLIW program counter 302 of holding the address on the instruction address bus 105, an adder 301 for incrementing the program counter 302, a decoder 309 for decoding the address from the program counter 302, a VLIW core control register (REG) for holding information as to acceptability of VLIW activation and what is necessary for VLIW activation, a VLIW start decision circuit 310 for deciding the activation of VLIW on receiving information about the signal 103 informing a branch to the VLIW instruction based on the decoded result, a value of a VLIW core control register 308 and the VLIW instruction running state signal 110, and the VLIW table storage memory 307 for controlling the VLIW table according to information from the VLIW core control register 308. In this case, the VLIW core control register 308 is updated via the VLIW table data bus 122.

The VLIW instruction decode unit 115 includes a multiplexer 313 for selecting the VLIW instruction from the VLIW instruction bus 112, an adjusting circuit 311 for deciding execution control on receiving information about a VLIW instruction completion code on the VLIW instruction bus 112 and an RISC instruction code on a control signal 137, a starting circuit 312 for controlling the activation of VLIW computing units on receiving the VLIW instruction decode start signal 111, and a VLIW arithmetic unit control circuit 314 for controlling a plurality of arithmetic units prepared for VLIW.

Modified Example of VLIW Core

Figure 4:
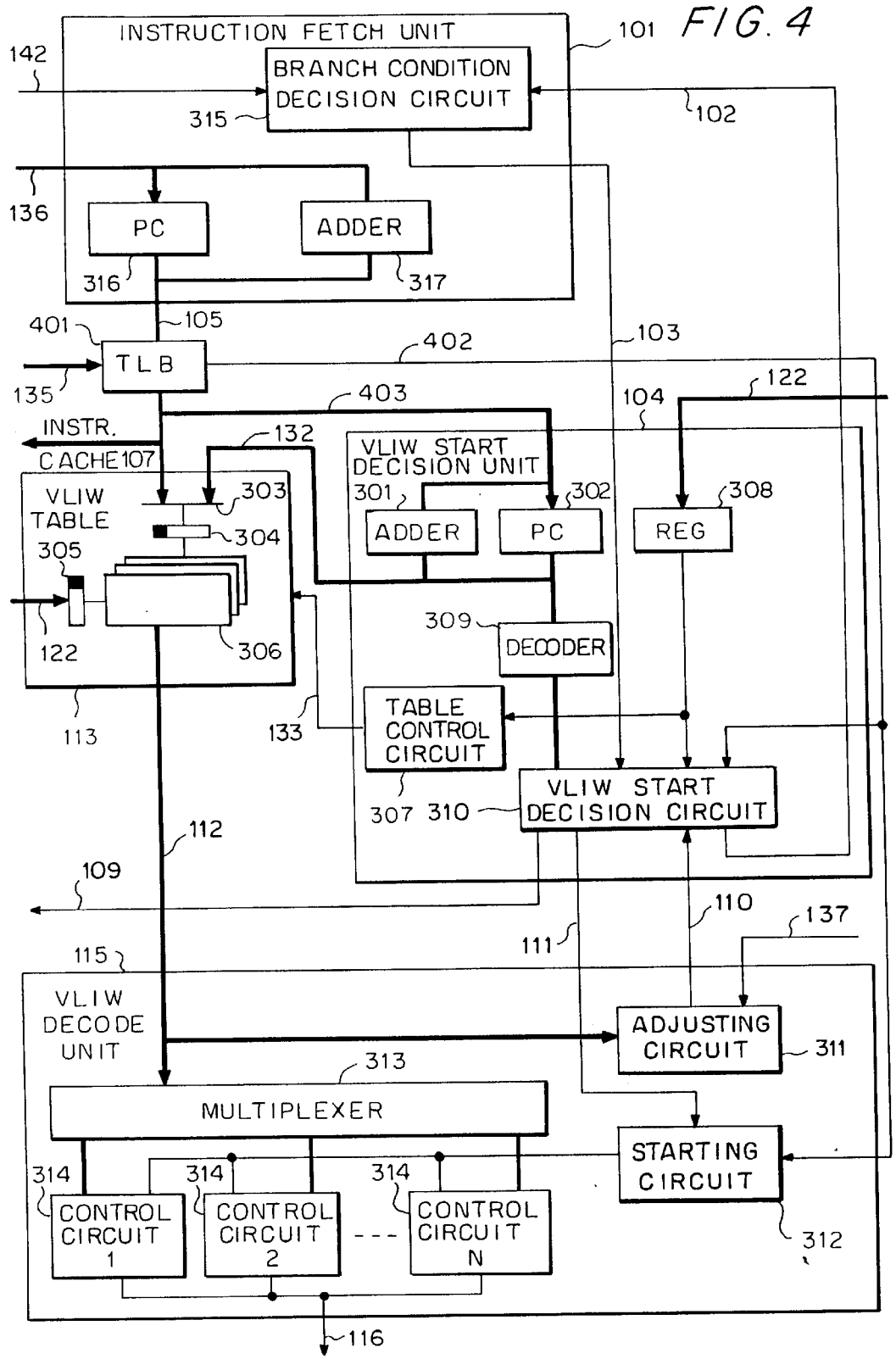
FIG. 4 is a detailed illustration of the VLIW start theory when a translation table in a translation-lookaside-buffer (TLB) is used for the microprocessor in FIGS. 1 and 2.

FIG. 4 refers to a case where the microprocessor of FIGS. 1 and 2 has a built-in address translation table in a translation-lookaside-buffer (TLB) of a memory management unit (MMU) for translating logical addresses into physical addresses.

As shown in FIG. 4, in contrast to FIG. 3, an address translation buffer 401 is situated between the instruction fetch unit 101 and the VLIW table 113, wherein like reference characters designate like component parts of FIG. 3.

The address translation buffer 401 is used to translate an instruction address (logical address) 105 into an instruction address (physical address) 403, which is transferred to the instruction cache 107, the VLIW table 113 and the VLIW start decision circuit 104. When the instruction address is translated in the address translation buffer 401, a VLIW start auxiliary information signal 402 is read out and utilized for the operation of the VLIW start decision circuit 310 and the stating circuit 312.

Operating Timing

Figure 5A:
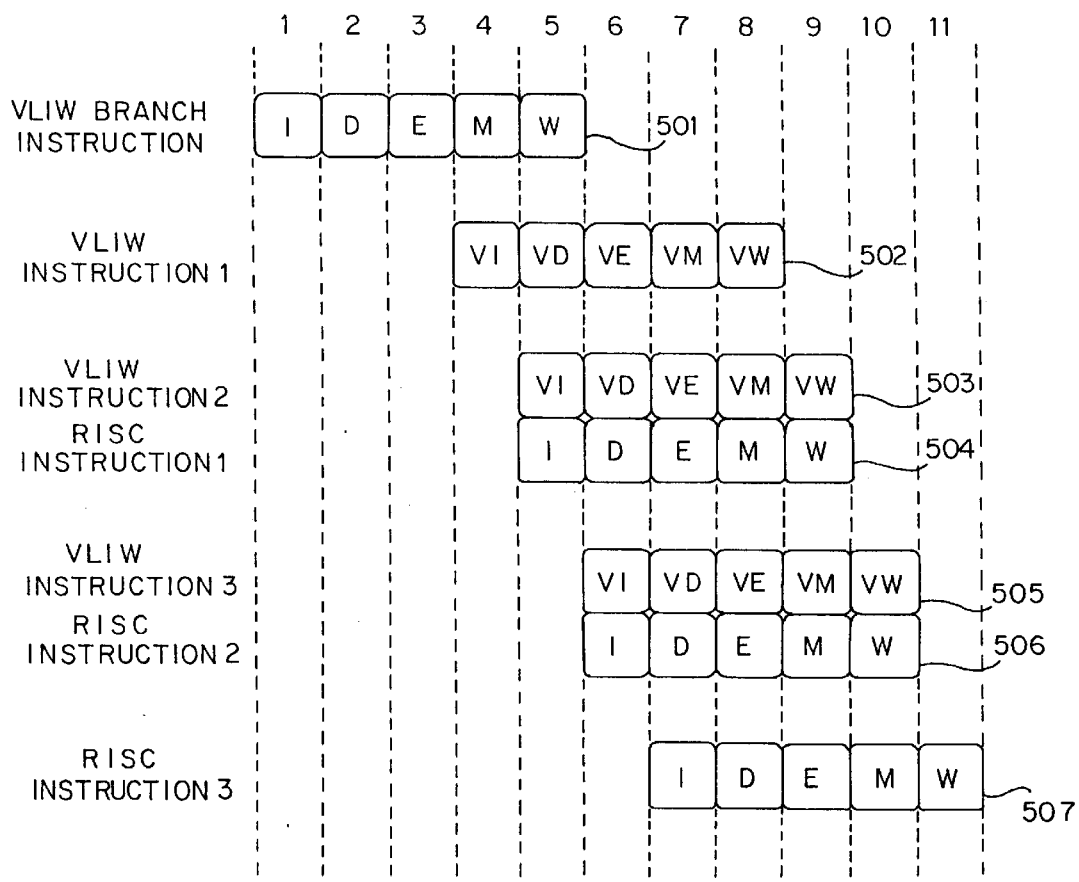
FIGS. 5A and 5B illustrate an example of pipeline configuration and instruction codes when the VLIW instruction is executed.

FIG. 5A shows a timing chart and an example of VLIW instruction code allocation in a case where the VLIW and RISC instructions are executed in parallel by the VLIW branch instruction.

The VLIW branch instruction is a sort of RISC instruction and like RISC instructions 1, 2, 3, executed through the pipeline processing in the RISC core section 106 and reference numerals 501, 504, 506 and 507 denote their pipeline stages. Namely, I represents an instruction fetch; D, an instruction code; E, execution; M, memory access; and W, a write stage. Further, VLIW instructions 1, 2, 3 are executed through the pipeline processing and reference numerals 502, 503, 505 denote their pipeline stages; namely, VI, VD, VE, VM, VW represent an instruction fetch for VLIW, an instruction decode, execution, memory access and a write stage, respectively.

Assuming that a branch to the VLIW instruction 1 occurs three cycles after the VLIW branch instruction, the pipeline 502 of the VLIW instruction 1 starts at a cycle 4. When the VLIW instruction which follows the VLIW instruction 2 is not dependent on the RISC instruction at the return destination after the execution of the VLIW instruction, it is possible to carry out the execution 503 of the VLIW instruction 2 and the execution 504 of the RISC instruction 1 in parallel. The execution 505 of the VLIW instruction 3 and the execution 506 of the RISC instruction 2 may also be carried out in parallel and when the VLIW instruction is completed, the pipeline for the VLIW instruction disappears and only the execution 507 of the RISC instruction 3 is carried out.

Figure 5B:
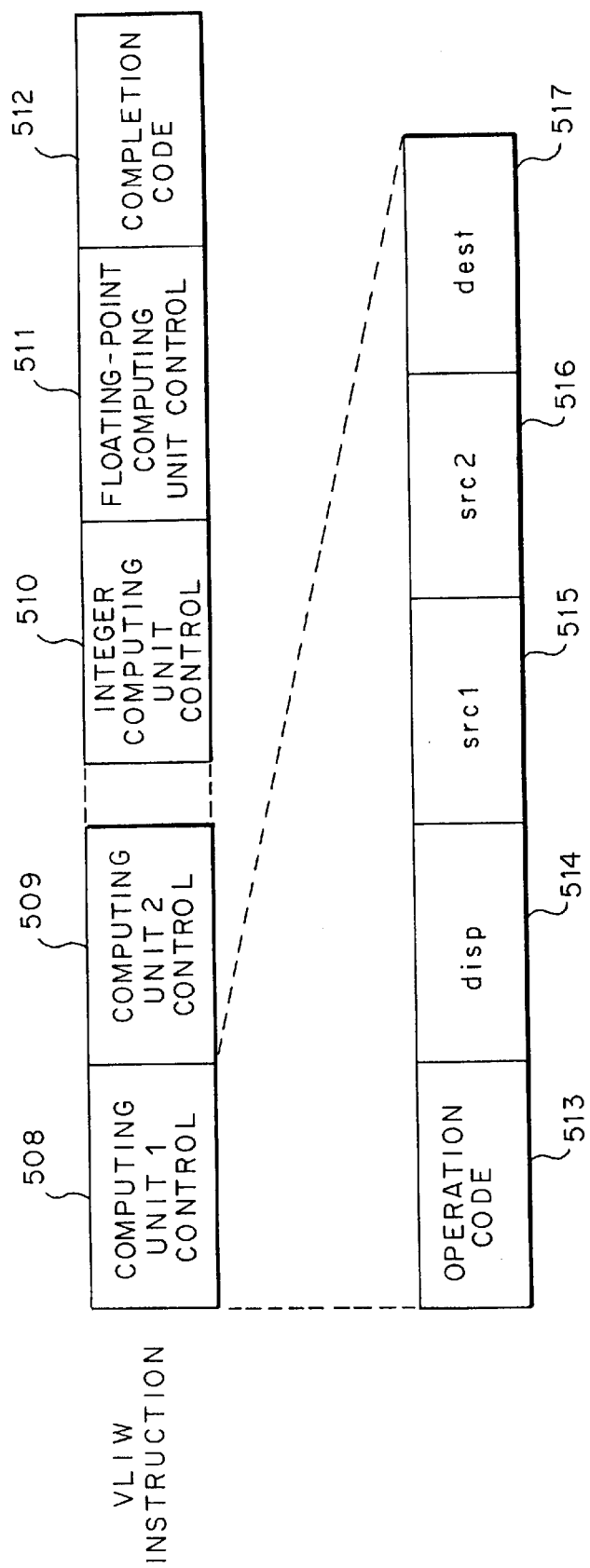

An example of the code allocation of the VLIW instruction read from the VLIW table at the VI stage is shown in FIG. 5B. A code for controlling the plurality of computing units is buried in one VLIW instruction. The instruction length of the VLIW instruction is a fixed length of 128 or 256 bits. Reference numeral 508 denotes a field for controlling the VLIW computing units 1; 509, a field for controlling the VLIW computing units 2; 510, a field for controlling the integer computing units; 511, a field for controlling the floating-point computing units; and 512, a field for storing the completion of the VLIW instruction and other items of information. Each of the fields 508, 509, 510, 511, 512 is 32-bit long and the operational code of 513, the displacement of 514, the source register 1 of 515, the source register 2 of 516 and the destination register of 517 are allocated. A VLIW decoder decodes this instruction code so as to control each computing units.

System Configuration

Figure 6:
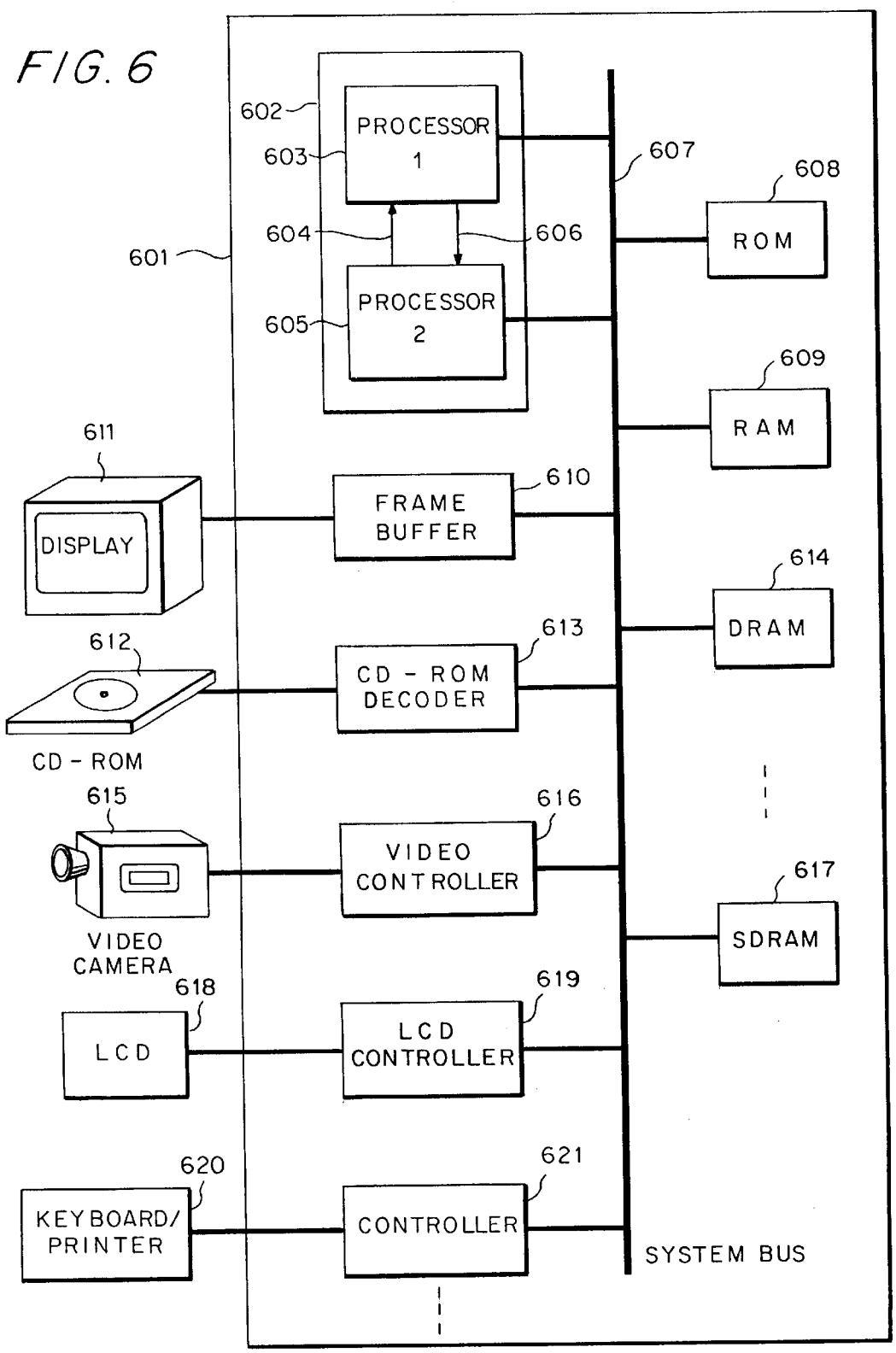
FIG. 6 is a general view of a system utilizing a microprocessor according to the present invention.

FIG. 6 is a general view of a system utilizing the present invention. Reference numeral 601 denotes a system built on one or a plurality of printed boards to which a display 611, a CD-ROM (Compact Disc-ROM) 612, a video camera 615, an LCD (Liquid Crystal Display) 618 and peripheral devices 620 such as a keyboard and a printer are connected. The system 601 includes a processor 602, a ROM 608 for storing programs, an SRAM 609 for storing data and programs, a DRAM 614 and an SDRAM (Synchronous DRAM) 614, a three-dimensional graphic frame buffer 610 for storing display image data and the like, a CD-ROM decoder 613 for controlling the CD-ROM, a video controller 616 for controlling the video camera, a LCD controller 619 for controlling a liquid crystal display (LCD), and a peripheral device controller 621 for controlling the peripheral devices 620 such as the keyboard and the printer, these component parts being connected to a system bus 607.

The processor 602 includes a processor 1 (603) having a first instruction set and a processor 2 (605) having a second instruction set, wherein the processor 2 is controlled by the processor 1 through a control signal 606 and the processor 1 by the processor 2 through a control signal 604. As the processor 602 is capable of processing three-dimensional graphics and encoding/decoding of MPEG at high speed, it is possible to dispense with a conventional dedicated hardware circuit, decrease the number of semiconductor chips to be packaged on the printed board and decrease the number of printed boards or the size of a printed board itself.

One Chip Processor

Figure 7:
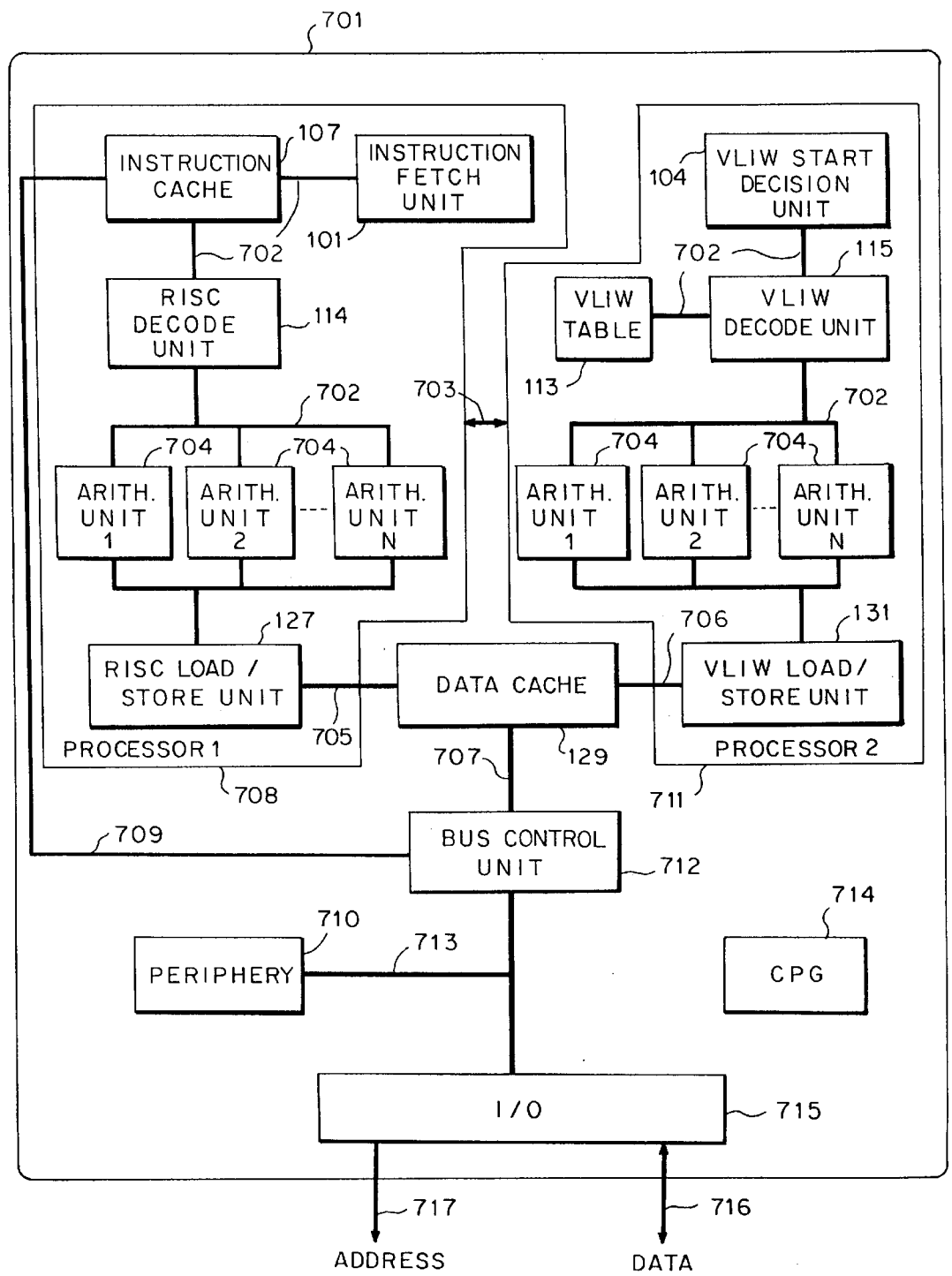
FIG. 7 is a block diagram of a one-chip processor.

FIG. 7 is a block diagram of a processor when the processor 602 of FIG. 6 is formed with one semiconductor integrated circuit device (processor contained in one chip). In this case, the technology of manufacturing semiconductor integrated circuits is used to form a processor 701 on one semiconductor substrates of single crystal silicon and the resin molding technique is used for the packaging of the semiconductor substrate by so-called plastic packaging. Memories such as ROM 608 and RAM 609 may be contained.

The one-chip processor 701 includes a processor 1 (708) having a first instruction set, a processor 2 (711) having a second instruction set, the data cache 129, a peripheral unit, a clock pulse generator circuit (CPG) 714 and an input-output circuit (I/O) 715.

When the processor 1 (708) and the processor 2 (711) are used in combination, a combination of a RISC processor with a 16-bit fixed length instruction and a VLIW processor with a 64-bit fixed length instruction, a combination of a RISC processor with a 32-bit fixed length instruction and a VLIW processor with a 128-bit fixed length instruction, a combination of a RISC processor with a 64-bit fixed length instruction and a VLIW processor with a 256-bit fixed length instruction or the like may be used. In these combinations, the processors 1 and 2 may be reversed in order. FIG. 7 refers to a case where the processor 1 (708) is a RISC processor (RISC core 106 of FIG. 1), and the processor 2 (711) a VLIW processor (VLIW core 140 of FIG. 1).

The processor 1 (708) includes the instruction fetch unit 101, the instruction cache 107, the RISC instruction decode unit 114, one or a plurality of arithmetic units 704 and the RISC load/store unit 127, these being mutually connected by an internal bus 702. The instruction fetch unit 101 reads an instruction from the instruction cache 107 and the RISC instruction decode unit 114 analyzes the instruction thus read, causing the arithmetic units 704 to operate, whereby the RISC load/store unit 127 is activated whenever memory access is needed. A multiplication unit, an integer arithmetic unit, a floating-point unit, a substraction unit, a DSP and so forth are placed in the arithmetic unit 704. The arithmetic unit may have a plurality of similar arithmetic units. A bus 709 is used to input an instruction to the instruction cache from a bus control unit 712. The RISC load/store unit 127 uses the bus 705 to access the data cache 129 and the bus control unit 712 uses the bus 707 to fetch data into the data cache 129.

The processor 2 (711) includes the VLIW start decision circuit 104, the VLIW table 113, the VLIW instruction decode unit 115, one or a plurality of arithmetic units 704 and the VLIW load/store unit 131, these being mutually connected by the internal bus 702. When the activation of the VLIW instruction is decided by the VLIW start decision circuit 104, it is read from the VLIW table 113 and analyzed in the VLIW instruction decode unit 115 and the arithmetic units 704 operate, whereby the VLIW load/store unit 131 is activates whenever memory access is needed. For the VLIW table 113, use can be made of a non-volatile memory such as a masked ROM and a flash memory or a volatile memory such as a SRAM and a DRAM. When the VLIW table is located outside the chip, the VLIW instruction is read from outside via a bus control unit. A multiplication unit, an integer arithmetic unit, a floating-point arithmetic unit, a substraction unit, a DSP and so forth are placed in the arithmetic unit 704. The arithmetic unit may have a plurality of similar arithmetic units. The VLIW load/store unit 131 uses a bus 706 to gain access to the data cache 129.

The bus control unit 712 uses a bus 713 to gain access to the I/O 715, which transfers data to from the outside of the chip using an address signal 717 and a data signal 716. A peripheral module 710 and the like may be connected to the bus 713. An internal clock signal is generated by a CPG 714.

A control signal line (or bus) 713 is used for interfacing between the processor 1 (708) and the processor 2 (711). As shown in FIG. 7, coincidence control of data is facilitated because the data cache is owned commonly by the processors 1 and 2 incorporated into one chip. Moreover, security is reinforced since the processor-to-processor signal is confined to the chip. Further, cost reduction and high-speed performance are achievable because processor-to-processor communication speed can be increased and because the quantity of information to be transferred therebetween can be decreased.

A branch instruction for switching the processors or a branch to a specific address space is used as a trigger in the method of switching operations between the processors having different instruction sets according to this embodiment of the invention. When the operations are switched between the first processor and the second processor, either first or second processor is made the master processor for controlling the whole operation, whereas the other is made the slave processor. However, the master processor need not always be limited to one particular processor but either processor can be the master processor as occasion demands.

In a case where the operation of the master processor that has returned to the master position remains unaffected by that of the slave processor after operation is transferred from the master processor to the slave processor, the two processors may be operated in parallel by judging the dependency of the slave processor or the master processor.

Embodiment 2

Figure 8:
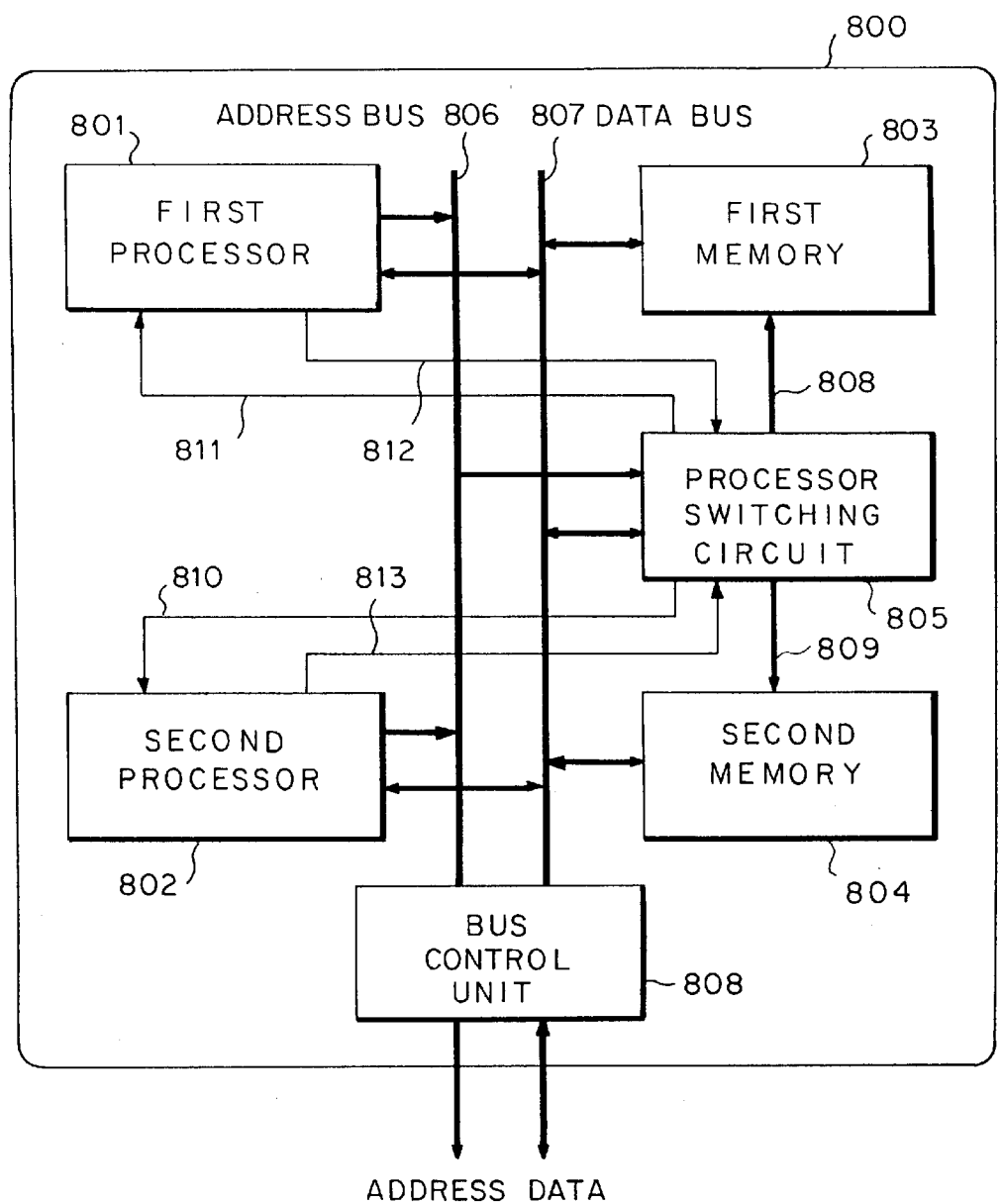
FIG. 8 is a block diagram of a microcomputer as another embodiment of the present invention.

FIG. 8 is a block diagram of a microcomputer 800 as another embodiment of the present invention. The technology of manufacturing semiconductor integrated circuits is used to form the microcomputer 800 on one semiconductor substrate of single crystal silicon and the resin molding technique is used for the packaging of the semiconductor substrate by so-called plastic packaging.

The microcomputer 800 includes a first processor 801, a second processor 802, a first memory 803, a second memory 804, a processor switching circuit 805, an address bus 806, a data bus 807 and a bus control unit 808.

The first processor 801 is a RISC type processor for executing an instruction of 16-bit fixed length. The second processor 802 is a VLIW type processor for executing an instruction of 64-bit length. The first and second processors 801, 802 are different in instruction system (instruction set, instruction format, programming model or the like). An instruction (program) to be executed by the first processor 801 is stored in the first memory 803, whereas an instruction (program) to be executed by the second processor 802 is stored in the second memory 804. The first and second memories 803, 804 are non-volatile or volatile memories. By making the first and second memories 803, 804 rewritable memories, not only the semiconductor supplier but also semiconductor users are able to write programs. In other words, users are allowed to construct both programs using a first and a second instruction set. Volatile, non-volatile and rewritable memories are similar to those used in the VLIW table 113 of the microprocessor of FIG. 1.

Memory Map

As shown in a memory map of FIG. 9, a program of the first processor 801 and a program of the second processor 802 are placed in the address space of the first processor 801 or the second processor 802. The whole or part of the program of the first processor is stored in the first memory 803, whereas the whole or part of the program of the second processor is stored in the second memory 804.

An address in the first processor 801 or the second processor 802 is input to the processor switching circuit 805 to decide which one of the first and second memories 803, 804 is accessed. When the first processor 801 has access to the first memory 803, it inputs an address signal and a control signal 812 to the processor switching circuit 805. The processor switching circuit 805 outputs an address signal and a control signal 808 necessary for providing access to the first memory 803. The processor switching circuit 805 also transfers to the second processor 802 a control signal 810 for suspending the operation of a pre-read instruction and a clock in order to lower power consumption. When the second processor 802 has access to the second memory 804, on the other hand, it inputs an address signal and a control signal 813 to the processor switching circuit 805. The processor switching circuit 805 transfers an address signal and a control signal necessary for providing access to the second processor 802 to a signal line 809. The processor switching circuit 805 also transfers to the first processor 801 a control signal 811 for suspending the operation of a pre-read instruction and a clock in order to lower power consumption. The processor switching circuit 805 causes the first and second processors to operate exclusively.

The first processor 801 executes its own program and outputs an address indicative of the program area of the second processor 802 by means of a branch instruction in the program, whereby it is allowed to execute the program of the second processor 802 in the second processor 802. The second processor 802 also outputs an address indicative of the program area of the first processor by means of a branch instruction in the program of the second processor 802, whereby the operation can return to the program of the first processor 801.

Incidentally, the processor switching circuit 805 contains a control register and the memory map of FIG. 9 can be altered by rewriting the register. The program area of the first processor, the program area of the second processor, the bead address and the final address of each data area and the like can be designated by the control register.

Thus programs in different instruction systems can be executed by one microcomputer. Moreover, software compatibility is maintainable because a program specified by a new architecture is executed by the second processor even though the program of the first processor is software that has been stored so far.

In addition, power consumption can effectively be lowered by suspending the operation of the clock in the unoperating processor.

Since the instruction length in the first and second processors 801, 802 is relatively short, the control unit such as an instruction decoder and the arithmetic unit can be small-sized, so that the capacity of the first memory 803 or the second memory 804 is increasable. In a case where the area occupied by the processor is not critical, the instruction length may be increased.

Since the operations can be switched between processors different in instruction set by a specific instruction according to this embodiment of the invention, extension to the processor having a different instruction set is possible while compatibility is maintained. Moreover, cost reduction is feasible because resources such as arithmetic units can be owned by different processor jointly.

In the case where processors having different instruction sets are incorporated into one chip, processor-to-processor communication speed can be increased and security is reinforced since the internal information is not output outside. The operation of one operating processor which requires no high-speed processing is completely stopped, whereas the other processor is made to perform the same function as that of the one processor whose operation has thus been stopped so as to lower power consumption.

Thus (1) performance as high as IGIPS (Giga Instructions Per Second), or maximum IOGOPS (Giga Operations Per Second), is achievable while complete software compatibility is maintained. (2) Performance of a middleware section can be increased ten times while existing software is kept in use. (3) New applications can be prepared with instruction sets maintained as they are. (4) All applications are achievable with software.

The foregoing invention has been described in detail in terms of preferred embodiments. However, the present invention is not limited to those embodiments but may be practiced in various modified ways without departing from the spirit and scope thereof. Although the microprocessor of FIG. 1, for example, is configured so that the computing units of the RISC and VLIW cores are arranged for common use mutually, they may be used independently as in the microprocessor of FIG. 2. FIG. 2 refers to a case where the load/store unit 204 is commonly used by the RISC and VLIW cores; however, there may be provided two load/store units for both the cores, respectively. Two processors having different instruction sets may be arranged instead of providing the RISC type processor as the first processor and the VLIW type processor as the second processor. In other words, processors of RISC and RISC types, RISC and CISC types, CISC and CISC types, CISC and VLIW types, VLIW and VLIW types or the like. Although combinations of 16 bits and 64 bits, 32 bits and 128 bits, and 64 bits and 256 bits have been shown to constitute the instruction lengths of the RISC processor and the VLIW processor by way of example, instruction lengths are not limited to the combinations above. Moreover, new embodiments may be formed according to the present invention by replacing the whole or part of the combinations of the instruction lengths if necessary.

Thus, according to the above the data processor of the present invention has a first processor for executing conventional software and a second processor for executing software of a new architecture. Since the first processor is able to activate the second processor, it is possible to attain a high-performance processor capable of executing software using a new architecture (instruction system) while maintaining compatibility with conventional software. High-performance can be realized by jointly forming for common use resources in the two processor such as arithmetic units so as to prevent an increase in hardware. Both high-speed operation and low power consumption can be realized since two control systems are possible under which two processors are operated in parallel or intermittently.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A data processor comprising:

a first processor;

a second processor;

wherein when said first processor executes a predetermined instruction of a first instruction set, said second processor executes an instruction of a second instruction set different from said first instruction set; and a circuit for examining whether an operation of the instruction of the first instruction set executed subsequent to a branch to the instruction of the second instruction set is relevant to an operation of the instruction of the first instruction set which is restored after the execution of the instruction of the second instruction set, said microprocessor being capable of executing the instruction of the first instruction set at the restoring destination in parallel without waiting for the completion of the instruction of the second instruction set when no relevance exists.

2. A data processor according to claim 1, wherein an instruction of said first instruction set has a variable length and an instruction of said second instruction set has a fixed length.

3. A data processor according to claim 1, wherein an instruction of said first instruction set and an instruction of said second instruction set each have a fixed length.

4. A data processor according to claim 3, wherein a length of an instruction of said first instruction set is shorter than a length of an instruction of said second instruction set.

5. A data processor according to claim 1, wherein said second instruction set has an instruction for three-dimensional graphic processing.

6. A data processor, comprising:

a first data processing unit which has a plurality of arithmetic units and is used for reading an instruction from a first memory which stores a first group of instructions, and executing the instruction;

a second data processing unit which has a plurality of arithmetic units capable of parallel operation and is used for executing instructions simultaneously executable as one instruction;

a second memory for storing a second group of instructions executed by said second data processing unit, wherein when an instruction from said first group read by said first data processing unit is a predetermined instruction, an instruction from said second group is read from said second memory and executed by said second data processing unit; and a circuit for examining whether an operation of the instruction of the first instruction set executed subsequent to a branch to the instruction of the second instruction set is relevant to an operation of the instruction of the first instruction set which is restored after the execution of the instruction of the second instruction set, said microprocessor being capable of executing the instruction of the first instruction set at the restoring destination in parallel without waiting for the completion of the instruction of the second instruction set when no relevance exists.

7. A microprocessor, comprising:

a reduced instruction set computer (RISC) core for executing a RISC instruction, a very long instruction word (VLIW) table for storing VLIW instructions, a VLIW core for executing a VLIW instruction, and a VLIW start decision unit for controlling operation switching between said RISC core and said VLIW core, wherein when said RISC core executes a subroutine call or a branch instruction out of RISC instructions, a VLIW instruction is read from said VLIW table by use of a branch destination address, operation is transferred by said VLIW start decision unit from said RISC core to said VLIW core, and said VLIW core is caused to operate until a VLIW instruction completion code is read from said VLIW table; and a circuit for examining whether an operation of the VLIW instruction executed subsequent to a branch to the VLIW instruction is relevant to an operation of the RISC instruction which is restored after the execution of the VLIW instruction, said microprocessor being capable of executing the RISC instruction at the restoring destination in parallel without waiting for the completion of the VLIW instruction when no relevance exists.

8. A data processor according to claim 7, wherein the VLIW instructions include an instruction for three-dimensional graphic processing.

9. A microprocessor according to claim 7, further comprising:

an address translation table for subjecting the branch destination address to address translation so that a signal for expanding the VLIW instruction read from said VLIW table may be read from the address translation table simultaneously when the address translation is conducted.

10. A microprocessor according to claim 7, wherein a non-volatile memory has a built-in VLIW table.

11. A microprocessor according to claim 10, wherein said non-volatile memory is one of a masked ROM, a flash memory and a ferroelectric memory.

12. A microprocessor according to claim 7, wherein a volatile memory has a built-in VLIW table.

13. A microprocessor according to claim 12, wherein the volatile memory of said VLIW table is one of a SRAM and a DRAM.

14. A microprocessor according to claim 12, wherein a memory rewritable with the processor of the RISC core has a built-in VLIW table.

15. A data processor according to claim 7, wherein the RISC instructions have a variable length and the VLIW instructions have a fixed length.

16. A data processor according to claim 7, wherein the RISC instructions and the VLIW instructions each have a fixed length.

17. A data processor according to claim 16, wherein a length of the RISC instructions is shorter than a length of the VLIW instructions.

18. A microprocessor, comprising:

a reduced instruction set computer (RISC) core for executing a RISC instruction, a very long instruction word (VLIW) table for storing VLIW instructions, a VLIW core for executing a VLIW instruction, and a VLIW start decision unit for controlling operation switching between said RISC core and said VLIW core, wherein when said RISC core executes a subroutine call or a branch instruction out of RISC instructions, a VLIW instruction is read from said VLIW table by use of a branch destination address, operation is transferred by said VLIW start decision unit from said RISC core to said VLIW core, and said VLIW core is caused to operate until a VLIW instruction completion code is read from said VLIW table;

a register for storing information which is used to prohibit and control the execution of the VLIW instruction in a processor; and a function of lowering power consumption by causing a branch to a string of RISC instructions performing an operation equivalent to the VLIW instruction at the time execution of the VLIW instruction is prohibited so as to suspend the operation of the VLIW core.

19. A microprocessor according to claim 18, further comprising:

an address translation table for subjecting the branch destination address to address translation so that a signal for expanding the VLIW instruction read from said VLIW table may be read from the address translation table simultaneously when the address translation is conducted.

20. A microprocessor according to claim 18, wherein a non-volatile memory has a built-in VLIW table.

21. A microprocessor according to claim 20, wherein said non-volatile memory is one of a masked ROM, a flash memory and a ferroelectric memory.

22. A microprocessor according to claim 18, wherein a volatile memory has a built-in VLIW table.

23. A microprocessor according to claim 22, wherein the volatile memory of said VLIW table is one of a SRAM and a DRAM.

24. A microprocessor according to claim 22, wherein a memory rewritable with the processor of the RISC core has a built-in VLIW table.

25. A data processor according to claim 18, wherein the RISC instructions have a variable length and the VLIW instructions have a fixed length.

26. A data processor according to claim 18, wherein the RISC instructions and the VLIW instructions each have a fixed length.

27. A data processor according to claim 26, wherein a length of the RISC instructions is shorter than a length of the VLIW instructions.

28. A data processor according to claim 18, wherein the VLIW instructions include an instruction for three-dimensional graphic processing.

29. A microprocessor, comprising:

a reduced instruction set computer (RISC) core for executing a RISC instruction, a very long instruction word (VLIW) table for storing VLIW instructions, a VLIW core for executing a VLIW instruction, and a VLIW start decision unit for controlling operation switching between said RISC core and said VLIW core, wherein when said RISC core executes a subroutine call or a branch instruction out of RISC instructions, a VLIW instruction is read from said VLIW table by use of a branch destination address, operation is transferred by said VLIW start decision unit from said RISC core to said VLIW core, and said VLIW core is caused to operate until a VLIW instruction completion code is read from said VLIW table; and a register for storing information which is used to control the execution of VLIW instructions in the processor, wherein the execution of the VLIW instruction is prohibited if said register stores information for prohibiting the execution of the VLIW instruction.

30. A microprocessor according to claim 29, further comprising:

an address translation table for subjecting the branch destination address to address translation so that a signal for expanding the VLIW instruction read from said VLIW table may be read from the address translation table simultaneously when the address translation is conducted.

31. A microprocessor according to claim 29, wherein a non-volatile memory has a built-in VLIW table.

32. A microprocessor according to claim 31, wherein said non-volatile memory is one of a masked ROM, a flash memory and a ferroelectric memory.

33. A microprocessor according to claim 29, wherein a volatile memory has a built-in VLIW table.

34. A microprocessor according to claim 33, wherein the volatile memory of said VLIW table is one of a SRAM and a DRAM.

35. A microprocessor according to claim 33, wherein a memory rewritable with the processor of the RISC core has a built-in VLIW table.

36. A data processor according to claim 29, wherein the RISC instructions have a variable length and the VLIW instructions have a fixed length.

37. A data processor according to claim 29, wherein the RISC instructions and the VLIW instructions each have a fixed length.

38. A data processor according to claim 37, wherein a length of the RISC instructions is shorter than a length of the VLIW instructions.

39. A data processor according to claim 29, wherein the VLIW instructions include an instruction for three-dimensional graphic processing.

40. A microprocessor, comprising:

a reduced instruction set computer (RISC) core for executing a RISC instruction, a very long instruction word (VLIW) table for storing VLIW instructions, a VLIW core for executing a VLIW instruction, and a VLIW start decision unit for controlling operation switching between said RISC core and said VLIW core, wherein when said RISC core executes a subroutine call or a branch instruction out of RISC instructions, a VLIW instruction is read from said VLIW table by use of a branch destination address, operation is transferred by said VLIW start decision unit from said RISC core to said VLIW core, and said VLIW core is caused to operate until a VLIW instruction completion code is read from said VLIW table; and a register for storing information which is used to control the execution of VLIW instructions in the processor, wherein the execution of the VLIW instruction is prohibited and a plurality of RISC instructions equivalent to the VLIW instructions are executed if said register stores information for prohibiting the execution of the VLIW instructions.

41. A microprocessor according to claim 40, further comprising:

an address translation table for subjecting the branch destination address to address translation so that a signal for expanding the VLIW instruction read from said VLIW table may be read from the address translation table simultaneously when the address translation is conducted.

42. A microprocessor according to claim 40, wherein a non-volatile memory has a built-in VLIW table.

43. A microprocessor according to claim 42, wherein said non-volatile memory is one of a masked ROM, a flash memory and a ferroelectric memory.

44. A microprocessor according to claim 40, wherein a volatile memory has a built-in VLIW table.

45. A microprocessor according to claim 44, wherein the volatile memory of said VLIW table is one of a SRAM and a DRAM.

46. A microprocessor according to claim 44, wherein a memory rewritable with the processor of the RISC core has a built-in VLIW table.

47. A data processor according to claim 40, wherein the RISC instructions have a variable length and the VLIW instructions have a fixed length.

48. A data processor according to claim 40, wherein the RISC instructions and the VLIW instructions each have a fixed length.

49. A data processor according to claim 48, wherein a length of the RISC instructions is shorter than a length of the VLIW instructions.

50. A data processor according to claim 40, wherein the VLIW instructions include an instruction for three-dimensional graphic processing.

51. A data processor, comprising:

a first data processing unit which has a plurality of arithmetic units and is used for reading an instruction from a first memory which stores a first group of instructions, and executing the instruction;

a second data processing unit which has a plurality of arithmetic units capable of parallel operation and is used for executing instructions simultaneously executable as one instruction;

a second memory for storing a second group of instructions executed by said second data processing unit, wherein when an instruction from said first group read by said first data processing unit is a predetermined instruction, an instruction from said second group is read from said second memory and executed by said second data processing unit; and a register for storing information which is used to control the execution of the instruction of the second group of instructions in the processor, wherein the execution of the instruction of the second group of instructions in the processor is prohibited if said register stores information prohibiting the execution of the instruction of the second group of instructions in the processor.

52. A data processor, comprising:

a first data processing unit which has a plurality of arithmetic units and is used for reading an instruction from a first memory which stores a first group of instructions, and executing the instruction;

a second data processing unit which has a plurality of arithmetic units capable of parallel operation and is used for executing instructions simultaneously executable as one instruction;

a second memory for storing a second group of instructions executed by said second data processing unit, wherein when an instruction from said first group read by said first data processing unit is a predetermined instruction, an instruction from said second group is read from said second memory and executed by said second data processing unit; and a register for storing information which is used to control the execution of the instruction of the second group of instructions in the processor, wherein the execution of the instruction of the second group of instructions in the processor is prohibited and a plurality of the instructions of the first set of instructions equivalent to the instruction of the second group of instructions are executed if said register stores information prohibiting the execution of the instruction of the second group of instructions in the processor.

53. A data processor comprising:

a first processor;

a second processor;

wherein when said first processor executes a predetermined instruction of a first instruction set, said second processor executes an instruction of a second instruction set different from said first instruction set; and a register for storing information which is used to control the execution of the instruction of the second group of instructions in the processor, wherein the execution of the instruction of the second group of instructions in the processor is prohibited if said register stores information prohibiting the execution of the instruction of the second group of instructions in the processor.

54. A data processor according to claim 53, wherein the RISC instructions have a variable length and the VLIW instructions have a fixed length.

55. A data processor according to claim 53, wherein the RISC instructions and the VLIW instructions each have a fixed length.

56. A data processor according to claim 55, wherein a length of the RISC instructions is shorter than a length of the VLIW instructions.

57. A data processor according to claim 53, wherein the VLIW instructions include an instruction for three-dimensional graphic processing.

58. A data processor comprising:

a first processor;

a second processor;

wherein when said first processor executes a predetermined instruction of a first instruction set, said second processor executes an instruction of a second instruction set different from said first instruction set; and a register for storing information which is used to control the execution of the instruction of the second group of instructions in the processor, wherein the execution of the instruction of the second group of instructions in the processor is prohibited and a plurality of the instructions of the first set of instructions equivalent to the instruction of the second group of instructions are executed if said register stores information prohibiting the execution of the instruction of the second group of instructions in the processor.

59. A data processor according to claim 58, wherein the RISC instructions have a variable length and the VLIW instructions have a fixed length.

60. A data processor according to claim 58, wherein the RISC instructions and the VLIW instructions each have a fixed length.

61. A data processor according to claim 60, wherein a length of the RISC instructions is shorter than a length of the VLIW instructions.

62. A data processor according to claim 58, wherein the VLIW instructions include an instruction for three-dimensional graphic processing.

* * * * *